Nov. 18, 1924.

E. A. BEYL

FRICTION CLUTCH

Filed Dec. 1, 1922

Inventor
Emil A. Beyl
By his Attorneys

Nov. 18, 1924.
E. A. BEYL
FRICTION CLUTCH
Filed Dec. 1, 1922
1,516,138
2 Sheets—Sheet 2
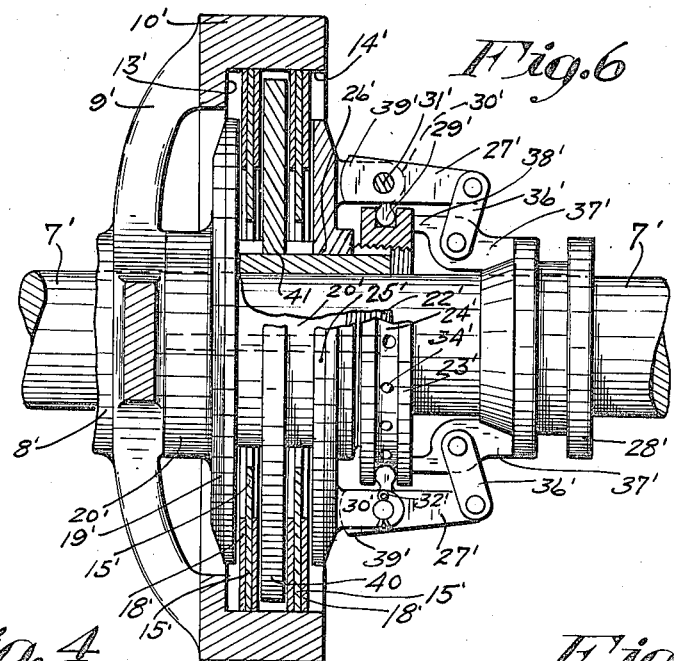
Fig. 6
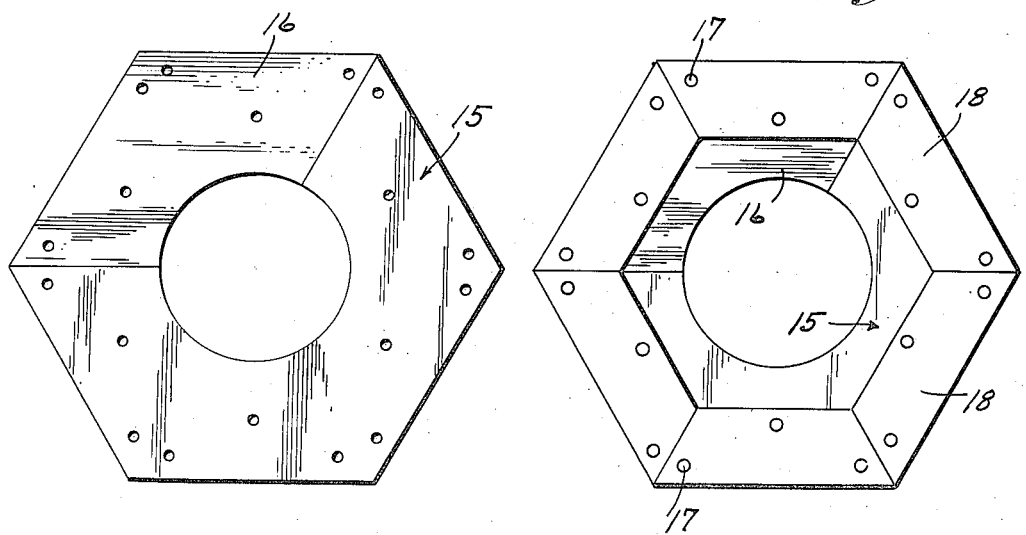
Fig. 4
Fig. 5
Inventor
Emil A. Beyl
By his Attorneys Patented Nov. 18, 1924.

1,516,138

UNITED STATES PATENT OFFICE.

EMIL A. BEYL, OF MINNEAPOLIS, MINNESOTA.

FRICTION CLUTCH.

Application filed December 1, 1922. Serial No. 604,354.

*To all whom it may concern:*

Be it known that I, EMIL A. BEYL, a citizen of the United States, residing at Minneapolis, in the county of Hennepin and State of Minnesota, have invented certain new and useful Improvements in Friction Clutches; and I do hereby declare the following to be a full, clear, and exact description of the invention, such as will enable others skilled in the art to which it appertains to make and use the same.

My invention relates to improvements in friction clutches of the same general type as disclosed in my United States Patent No. 1,330,931, issued Feb. 17, 1920, and has for its object to improve the same in the several particulars hereinafter noted.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 4 is an elevation of the clutch disc;

Fig. 5 is a view of the clutch disc with the friction plates secured thereto; and Fig. 6 is a view corresponding to Fig. 1, showing a slight modification.

Figure 1:
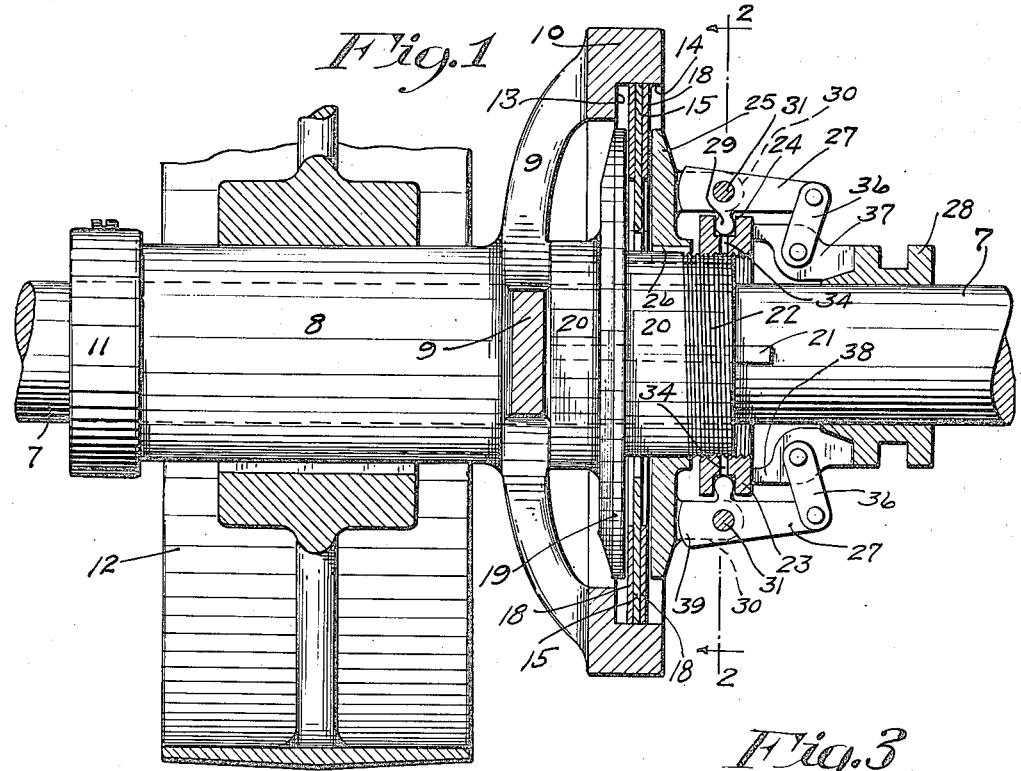
Fig. 1 is a fragmentary view partly in elevation and partly in central section with the clutch arranged to transmit power to the shaft to which it is applied.
Figure 2:
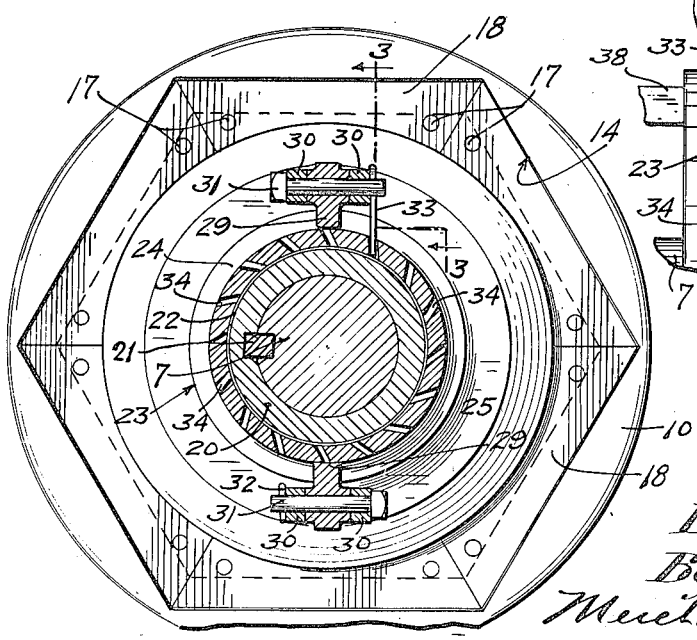
Fig. 2 is a view partly in elevation and partly in section taken on the line 2—2 of Fig. 1.
Figure 3:
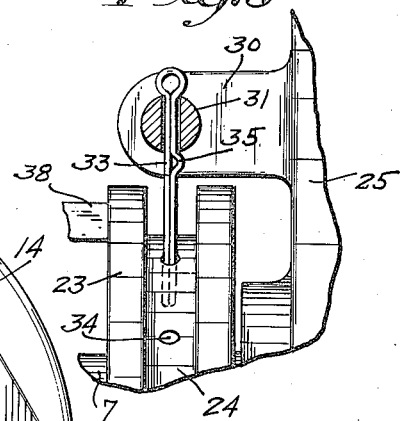
Fig. 3 is a detail view with some parts sectioned on the line 3—3 of Fig. 2, on an enlarged scale.

Referring first to the clutch as shown in Figs. 1 to 5, inclusive, the numeral 7 indicates a shaft on which is loosely journaled the hub 8 of a spider 9 integrally formed with said hub at one end thereof, and which spider carries an annular disc holder 10 through which said shaft extends axially. Keyed to the shaft 7, at the opposite end of the hub 8 from the spider 9, is a collar 11 which holds said hub against endwise movement from the clutch. A belt pulley 12 is keyed to the hub 8. The opposite face of the disc holder 10 from the spider 9 is recessed to form an internal disc seat 13 having a polygonal outer stop surface or shoulder 14.

Within the seat 13 is a disc 15 having a large axial opening, and which disc is free to float axially within said seat, and its outer edge has the same contour as the shoulder 14 and closely engages the same to lock said disc to the disc holder 10 for common rotation therewith. The disc 15 is provided with a loose displaceable segment 16 which, when removed, permits said disc to be applied to the shaft 7 or removed therefrom without disassembling the clutch other than unscrewing the collar 23 to retract the flange 25 to afford clearance between said flange and disc holder 10 for the disc 15. On each face of the disc 15 there is secured by rivets 17 a friction composition of any suitable make, such as used for brake linings, and is in the form of an endless sectional plate 18.

Interposed between the spider 9 and disc 15 is a fixed annular flange 19 integrally formed with the intermediate portion of a hub 20 secured to the shaft 7 for rotation therewith by a key 21. One end of the hub 20 engages the spider 9 as a base of resistance for said flange, and the other end of the hub 20 is provided with screw threads 22 to receive an internally screw-threaded collar 23 having an annular groove or channel 24. Obviously, by turning the collar 23 on the screw threads 22, the same may be adjusted toward or from the fixed flange 19 for a purpose that will presently appear. Loosely telescoped onto the hub 20 between the disc 15 and collar 23 is a flange 25, of the same shape as the fixed flange 19, and keyed at 26 to the hub 20 for rotation therewith but free to move axially on said hub toward and from the flange 19. It may be here stated that the loose displaceable segment 16 is held against lateral displacement in respect to the disk by the flanges 19 and 25.

For moving the flange 25 toward the flange 19 to clamp the disc 15 between the flanges 19 and 25 by the engagement of its friction surfaces 18 with said flanges and thereby set the clutch, there is provided a pair of diametrically opposite clutch dogs 27 and a shipper collar 28. These dogs 27 are in the form of short levers which extend substantially parallel to the axis of the shaft 7 and have on their inner ends fulcrum lugs 29 which project at right angles thereto and are mounted in the channel 24 of the collar 23. Said inner ends of the dogs 27 are mounted between pairs of laterally spaced lugs 30 carried by the disk 25 and which dogs are pivoted thereto by headed bolts 31. One of the bolts 31 is held in position by a short cotter pin 32, and the other bolt 31 is held in position by a long cotter pin 33 arranged to project into any one of a multiplicity of circumferentially spaced bores 34 formed in the collar 23 at the bottom of its channel 24 to lock said collar against rotation on the hub 20. To prevent the cotter pin 33 from being accidentally lifted from the bore 34 into which it projects, one leg thereof is provided with a hump 35 arranged to engage the respective bolt 31 on the opposite side thereof from the head of said cotter pin.

The outer ends of the clutch dogs 27 are connected to the shipper collar 28 by pairs of laterally spaced links 36. These pairs of links 36 embrace the clutch dogs 27 and lugs 37 integrally formed with the shipper collar 28. Formed with the lugs 37 are stops 38 arranged to engage the collar 23, during the releasing of the clutch, to limit the movement of the shipper collar 28 toward the collar 23. The inner ends of the clutch dogs 27 are extended to form counter-weights 39 which balance said clutch dogs. By reference to Fig. 1 it will be noted that the links 36 are beyond dead centers and hold the loose flange 25 inoperative. The engagement of the lugs 38 with the collar 23 positively holds the respective ends of the links 36.

By withdrawing the cotter pin 33 from the engaged hole 34, the collar 23 may be rotated and thereby adjusted toward or from the flange 19 to cause the clutch dogs 27 to set the movable flange 25 with a greater or less force to clamp the disc 15 between said flanges. By drawing outward on the shipper collar 28, the links 36, acting on the clutch dogs 27, will cause said dogs to move the flange 25 toward the flange 19 and set the clutch, and at which time the links 36 will be beyond dead centers and hold the clutch set.

As previously stated, the disc 15, due to its displaceable section 16, may be removed from the clutch simply by screwing the collar 23 outward on the hub 20 to give sufficient clearance between the disc holder 10 and flange 25 to remove said disc.

Referring now to the clutch as shown in Fig. 6, the parts thereof which correspond to like parts shown in Figs. 1 to 5, inclusive, are indicated by the respective prime numbers. In this form of the clutch, the seat 13' is materially deeper than the seat 13, and has mounted therein two floating clutch discs 15' between which is interposed a plate 40 free to rotate within the disc holder 10' and secured for rotation with the hub 20' by a key 41. While only two clutch discs 15' are shown in this form of clutch, it is, of course, understood that any desired number may be employed, and which discs greatly increase the gripping action of the clutch, over the clutch shown in Fig. 1.

From the above description it is evident that the improved clutch can be very quickly and easily adjusted to take up wear or to cause the flanges 19 and 25, which in the claims are referred to as clutch members, to grip the disc 15 with a greater or less force simply by adjusting the collar 23. Likewise, the disc 15 can be removed and relined and then replaced, or a new disc substituted for a worn out disc without disassembling the clutch.

The above described invention, has in actual commercial usage proven highly efficient for the purpose had in view.

What I claim is:

1. In a friction clutch, the combination with a hub-equipped clutch member, of a second clutch member mounted on the hub with freedom for axial movement thereon, a power transmission element having a friction disc intermediate of the two clutch members, a collar outward of the second clutch member and having screw-threaded engagement with the hub, levers fulcrumed on the collar for action on the axially movable clutch member, said collar being free for rotation in respect to the levers, and provided with a plurality of circumferentially spaced holes, a lock pin arranged to be inserted into any one of said holes to lock the collar against rotation on the hub, and means for operating the levers.

2. In a friction clutch, the combination with a hub-equipped clutch member, of a second clutch member mounted on the hub with freedom for axial movement thereon, a power transmission element having a friction disc intermediate of the two clutch members, a collar having screw-threaded engagement with the hub, levers fulcrumed on the collar for action on the axially movable clutch member, said collar being free for rotation in respect to the levers, means for operating the levers including a shipper collar and links connecting the levers thereto, and a stop for limiting the movement of the shipper collar toward the first noted collar to position the links beyond dead center when the clutch is released.

3. In a friction clutch, the combination with a shaft, of a clutch member having a hub mounted on the shaft and secured for rotation therewith, a second clutch member mounted on said hub with freedom for axial movement in respect thereto, a power transmission element having a friction disc intermediate of said two clutch members, a collar having screw-threaded engagement with said hub, levers operative on the axially movable clutch member and fulcrumed on the collar with freedom to permit axial adjustment of the collar on the hub, a shipper collar on the shaft, links connecting the levers to the shipper collar, said links being movable beyond dead center to cause said levers to hold the axially movable clutch member either set or released, and a stop on the shipper collar arranged to engage said axially adjustable collar to limit the movements of the links beyond dead centers when the axially movable clutch member is released.

4. In a friction clutch, the combination with a shaft, of two clutch members held for rotation with the shaft, one of said clutch members being free for axial movement in respect to the other of said clutch members, a power transmission element having a friction disc intermediate of said two clutch members, a collar axially adjustable in respect to the shaft and having a plurality of circumferentially spaced bores, a lever fulcrumed on the collar, a bolt connecting the lever to the axially movable clutch member, a cotter pin for holding said bolt and arranged to extend into any one of the bores in said collar to prevent rotation thereof, and means for operating the lever to clamp the clutch members on the friction disc.

In testimony whereof I affix my signature.

EMIL A. BEYL.